US006973433B2

(12) United States Patent
Haug

(10) Patent No.: US 6,973,433 B2
(45) Date of Patent: Dec. 6, 2005

(54) FRANKING MACHINE

(75) Inventor: Werner Haug, Langnau im Emmental (DE)

(73) Assignee: Frama AG, Lauperswil (CH)

( * ) Notice: Subject to any disclaimer, the term of this patent is extended or adjusted under 35 U.S.C. 154(b) by 417 days.

(21) Appl. No.: 10/009,679

(22) PCT Filed: Feb. 22, 2001

(86) PCT No.: PCT/CH01/00117

§ 371 (c)(1),
(2), (4) Date: Oct. 20, 2001

(87) PCT Pub. No.: WO01/62505

PCT Pub. Date: Aug. 30, 2001

(65) Prior Publication Data

US 2002/0161728 A1 Oct. 31, 2002

(30) Foreign Application Priority Data

Feb. 23, 2000 (CH) ........................................ 345/00

(51) Int. Cl.[7] .................................................. G06F 17/00
(52) U.S. Cl. .............................. 705/1; 347/2; 347/104; 347/140
(58) Field of Search ......................... 705/1, 408; 347/2, 347/12, 104, 140

(56) References Cited

U.S. PATENT DOCUMENTS 4,821,049 A 4/1989 Eckl
5,166,883 A 11/1992 Gilham
5,880,755 A 3/1999 Fajour et al.
5,913,627 A 6/1999 Freeman et al.
6,390,577 B1 * 5/2002 Fajour ........................... 347/2

FOREIGN PATENT DOCUMENTS

FR 2768078 3/1999
JP 02003246167 A * 9/2003

OTHER PUBLICATIONS

IBM Technical Disclosure Bulletin; Title: Ink Jet pen System; May 1999; vol. 42.*

* cited by examiner

*Primary Examiner*—Elisca Pierre Eddy
(74) *Attorney, Agent, or Firm*—Friedrich Kueffner

(57) ABSTRACT

The invention relates to a franking machine that comprises at least one print head of an inkjet printer for printing flat mail items such as letters or postcards that are inserted into or run through said franking machine. The inventive franking machine comprises a guide part that is mounted around the print head so as to project vis-á-vis the nozzle plane thereof. Said guide part is associated with a conveyor that conveys the mail items between itself and opposite rotating convey rollers that rotate about pins mounted transversally to the direction of conveyance. Said conveyor is provided with driving rollers that are mounted, when seen in the direction of conveyance, before and behind the print head (228). A counter-pressure roller is disposed opposite these driving rollers and exerts a pressure on a respective driving roller or on a mail item conveyed therethrough, said counter-pressure roller being reversibly liftable. The franking machine further comprises a device for servicing, cleaning and maintaining the print head. When the counter-pressure rollers (13, 15) are lowered, a service carriage (201) that is driven to be displaced transversally to the direction of conveyance of the mail items can be displaced into a service position below the print head (228).

11 Claims, 11 Drawing Sheets

FRANKING MACHINE

Figure 1:
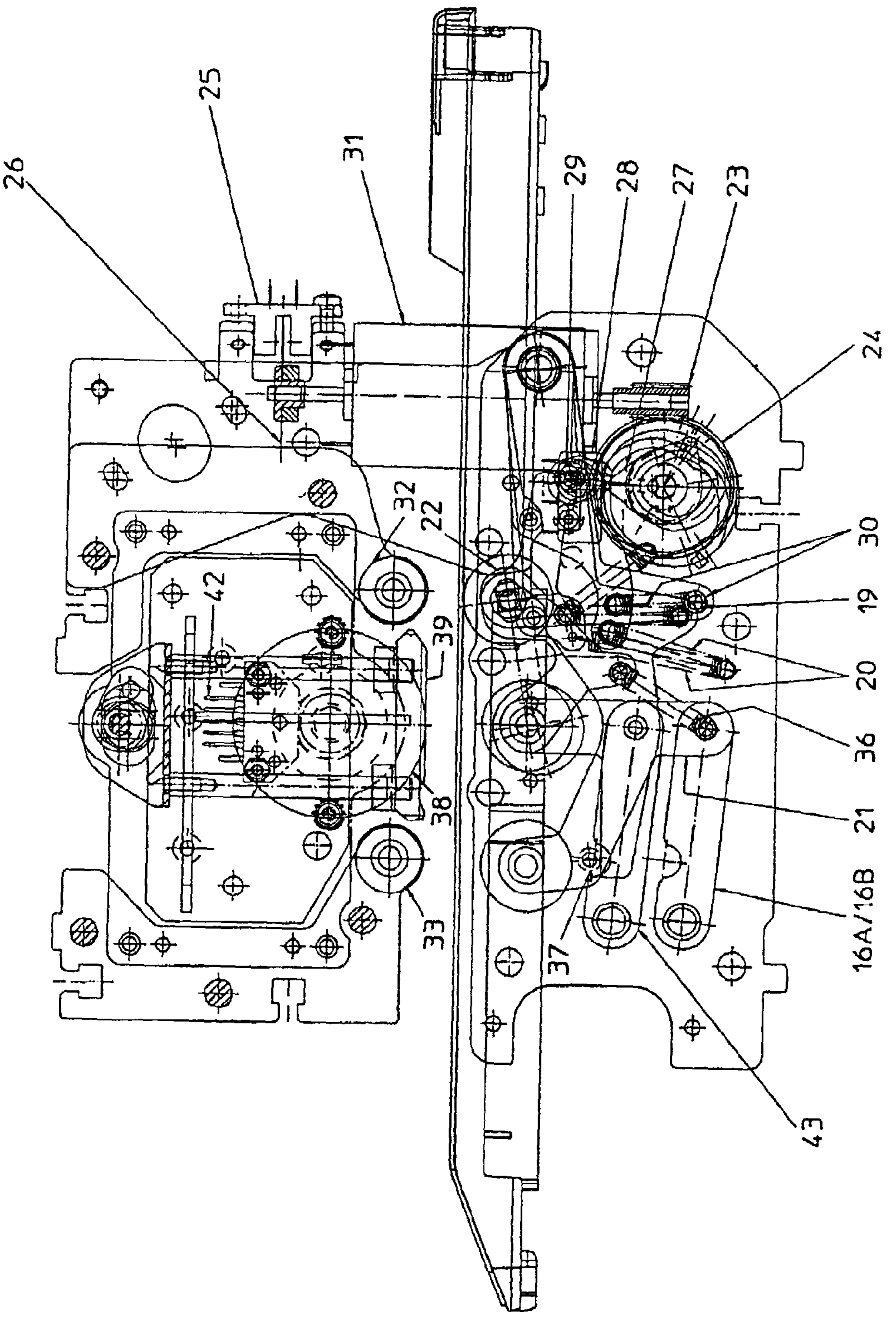

The invention relates to a franking machine with at least one print head of an inkjet printing mechanism for printing flat postal objects, such as letters or postcards, inserted into or passing through the machine, comprised of a guide part arranged so as to project from the print head and relative to its jet plane and having correlated therewith a transport device for transporting the postal objects between it and oppositely positioned conveying rollers rotating about axes oriented transverse to the conveying direction, wherein the transport device comprises two drive rollers connected in driving connection with one another and forming together with the guide part a conveying path, which drive rollers, when viewed in the conveying direction, are supported before and behind the print head, and comprises a counterpressure roller arranged opposite thereto, respectively, which exerts a pressure against the drive roller or the postal object to be transported therebetween and which is reversibly liftable, and comprising a device for maintaining, cleaning and caring for the print head. The franking machines employ today in addition to the classical rotary printing technology increasingly new stamp application methods, inter alia, based on thermal or inkjet basis.

It has been shown in practice that not only the print head must be replaced, but depending on the printing technology the entire franking machine configuration is subject to greater and very complex, i.e., also correspondingly expensive, changes and modifications.

Inkjet print heads have been known for quite some time and are used, in particular, in PC printers. The knowledge that has been gained for use of such print heads in this field cannot be transferred onto the present field of use in franking machines. The reasons, inter alia, lie in the high speed of the letters undergoing franking as well as their different formats and thicknesses as well as the considerably rougher conditions of the surroundings, caused partially by soiled surfaces of the postal objects. Moreover, these franking prints must fulfill strict quality requirements of the postal offices, which make necessary high construction expenditure and reliability.

The object of the present invention resides in providing a franking machine with an inkjet print mechanism that enables a disruption-free printing for the franking of postal objects, such as letters, cards or the like, and an unequivocally identifiable print image. It is also important that the employed printing ink during standstill phases will not dry up in the print head, i.e., the printing machine should be usable anytime. Moreover, in the configuration of the franking machine it should be taken into account that leaking of the printing ink cannot occur during transport. It is also desirable to be able to clean a print head which is soiled by dust and printing ink. Moreover, conditions are to be provided that ensure a high reliability and low-maintenance configuration.

According to the invention this object is solved in that, when the counterpressure rollers are lowered, a service slide, arranged on a guide arrangement so as to be drivingly movable transverse to the conveying direction of the postal objects, can be moved into a service position which is arranged underneath the print head.

In the following the functions and the configuration of an embodiment of the printing machine according to the invention is described. For a better understanding, reference is being had to the reference numerals and Figures in which embodiments of the invention are illustrated.

1A forward control curve for right counterpressure roller
1B rear control curve for right counterpressure roller
2A forward control curve for left counterpressure roller
2B rear control curve for left counterpressure roller
3 main shaft
4 rear sidewall
5 forward sidewall
6A counterpressure lever, left, front
6B counterpressure lever, left, rear
7A control lever, left, front
7B control lever, left, rear
8A counterpressure lever, right, front
8B counterpressure lever, right, rear
9A control lever, right, front
9B control lever, right, rear
10 axle for counterpressure lever and control lever
11 stop bolt for counterpressure lever—right
12 stop bolt for counterpressure lever—left
13 counterpressure roller—right
14 support roller
15 counterpressure roller—left
16A linkage, front, for support roller
16B linkage, rear, for support roller
17 axle for linkage
18 rod for suspending spring
19 suspension location for spring
20 tension spring for control lever
21 support roller carrier with sensor member
22 cam follower
23 worm shaft
24 worm gear
25 forked light barrier
26 slotted disk
27 switching cam for initial position of main shaft
28 microswitch
29 control roller
30 tension spring for counterpressure lever
31 direct-current motor
32 drive roller, right
33 drive roller, left
34 axle for counterpressure roller, right
35 stop for cam follower
36 tension spring for cam follower
37 stop for sensor member
38 sensor wheel for incremental transponder
39 holding-down plate or guide part
40 drive motor for feed
41 gearbox for drive rollers
42 incremental transponder, encoder
43 projecting member on support roller carrier

DESCRIPTION OF THE DRAWING CONTENTS OF THE FOLLOWING FIGURES

Figure 2:
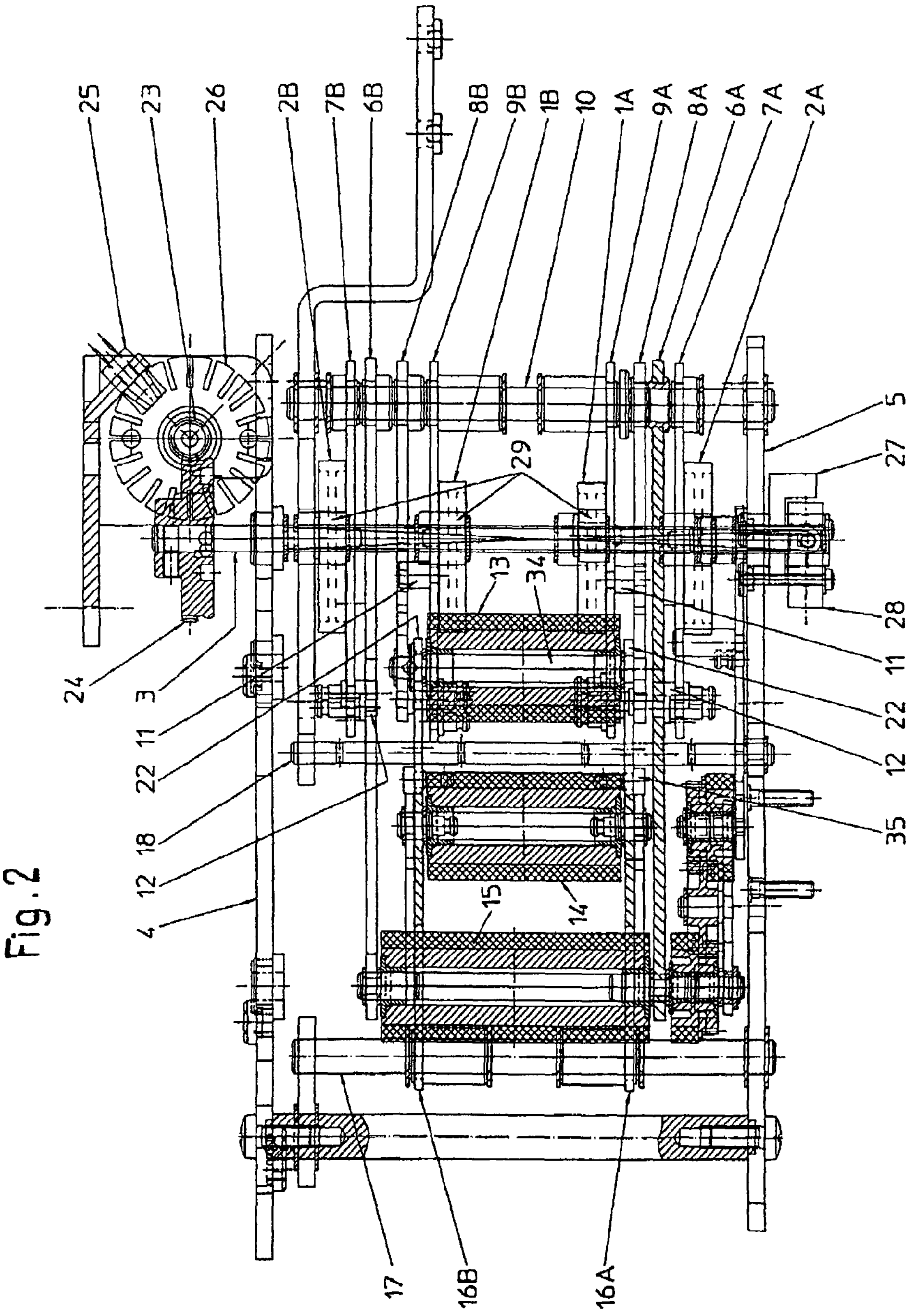
Figure 3:
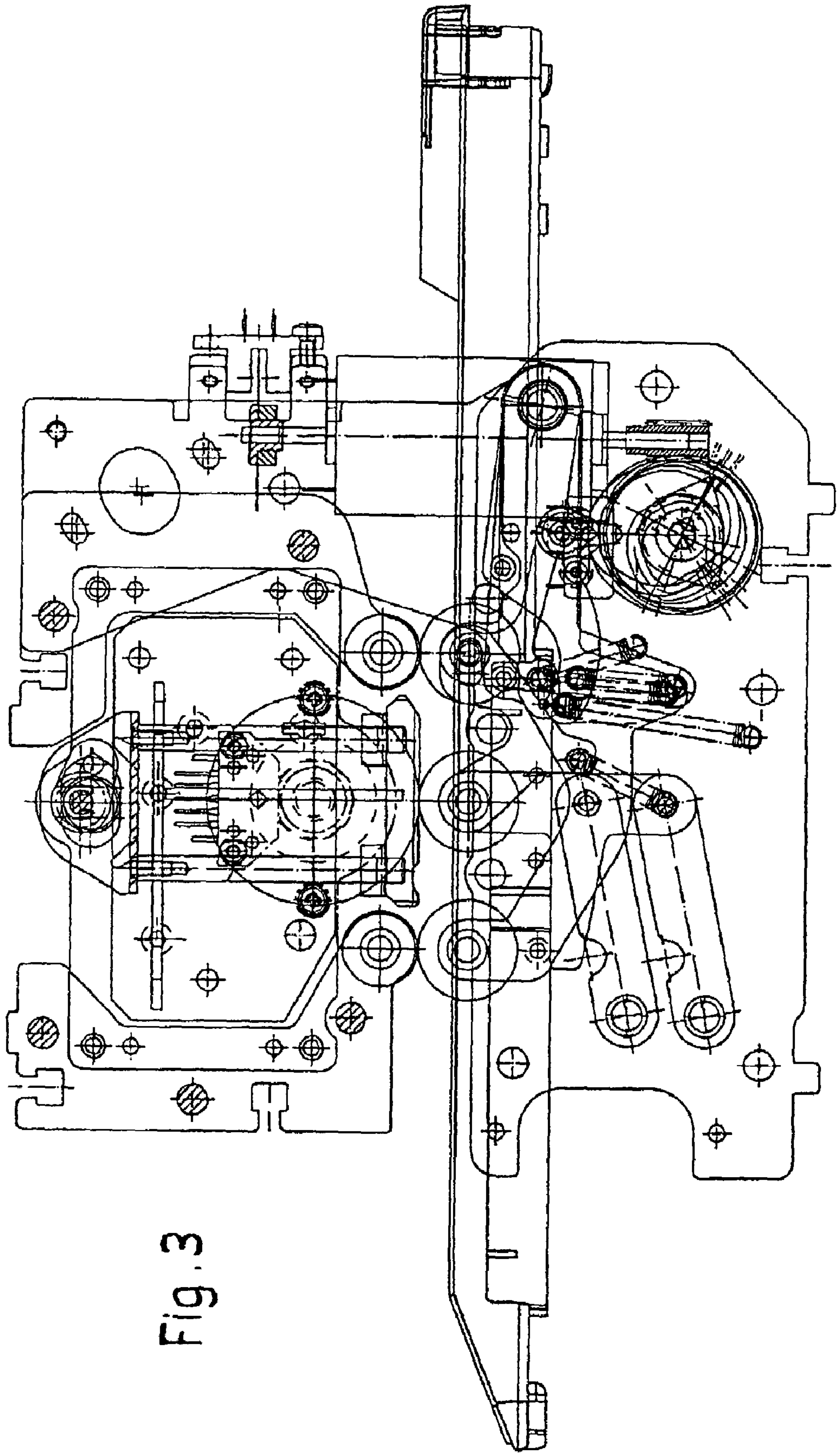
Figure 4:
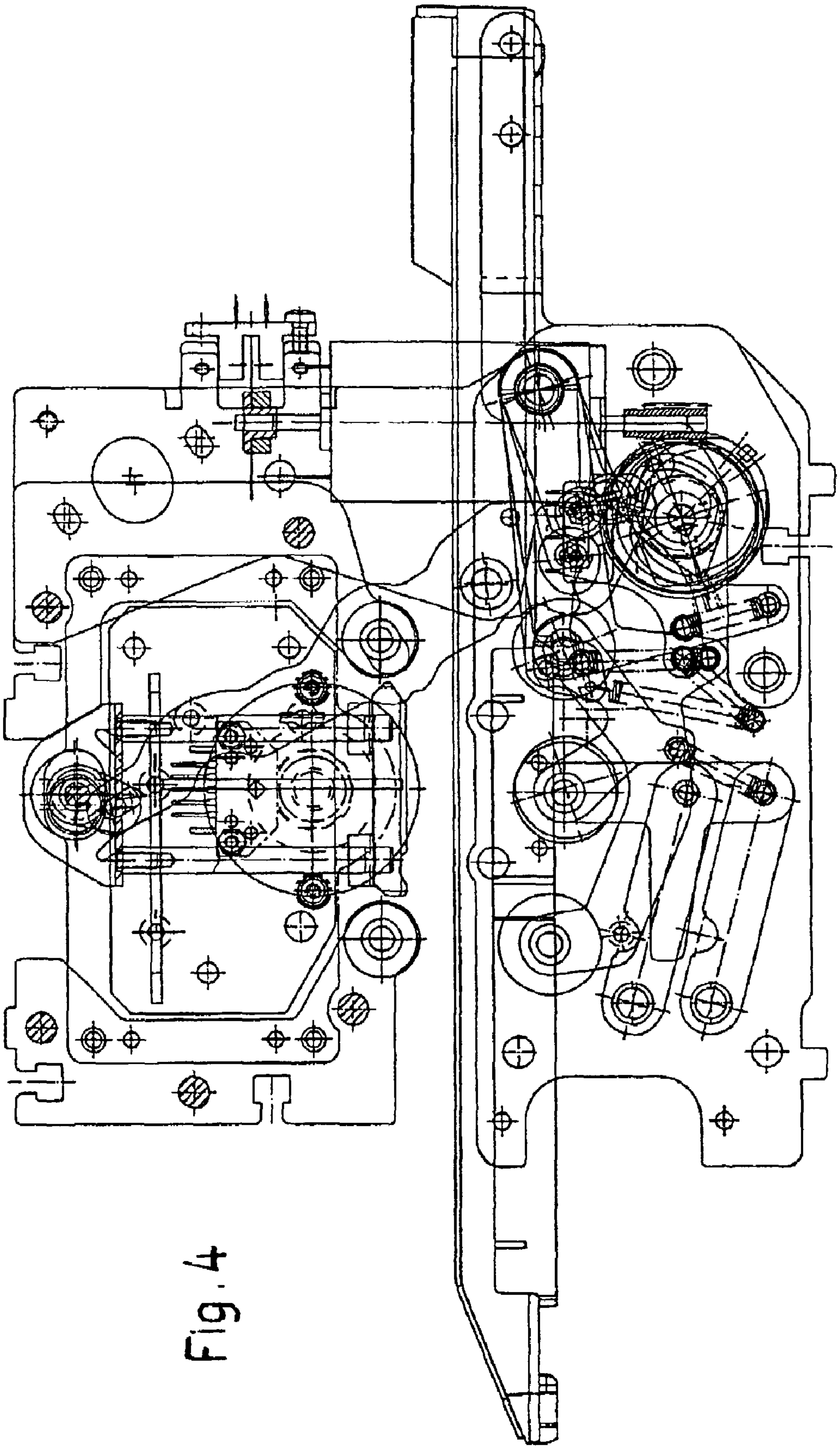

FIG. 1 front view of the complete counterpressure mechanism, including drive, sensor wheel, and main shaft drive;

FIG. 2 plan view onto counterpressure mechanism;

FIG. 3 front view of the complete counterpressure mechanism in franking position, counterpressure arrangement in upper position;

FIG. 4 front view of the complete counterpressure mechanism in service position, counterpressure arrangement in lowermost position.

In the case of franking of individual letters, the letter is inserted manually into the franking machine. Photo cells start the franking process when the envelope is correctly positioned. The counterpressure rollers which are in a lower position upon insertion of the envelope are moved upwardly by the control curves on the main shaft and press the letter object against the upper drive rollers. The letter transport or the franking process is started.

The counterpressure arrangement is comprised of three counterpressure rollers. Two rollers are positioned under the right and left drive rollers. The third, central roller has the object to move the letter to the required height level under the print heads without pressing the letter against the end faces of the print heads so that the print image remains clean without smearing. After the franking process, the counterpressure rollers move again downwardly and release the gap for the insertion of a new envelope.

In addition to the insertion and franking positions of the counterpressure rollers, there is also a position "service". In this position the counterpressure rollers are moved farther downwardly in order to provide room for the service station. The service station cleans and closes the print heads for longer work interruptions. Moreover, it is required for filling the print heads when changing the ink bag.

On the main shaft 3 several control curves 1A, 1B and 2A, 2B are Fry arranged which lift or lower, depending on the required position, the control levers 7A, 7B and 9A, 9B via the control rollers 29 so as to be pivoted about the axle 10. The initial position of the main shaft 3 is found by the microswitch 28 switched by the control cam 27. By means of the motor 31 the worm gear mechanism 23/24 is driven and the main shaft is rotated into the position "insertion of letter", "franking", or "service position". The precise position is reached by a forked light barrier 25 and the slotted disc 26 seated on the motor shaft by means of electronic control. The counterpressure levers to the right and left 6A, 6B and 8A, 8B are pivoted by the tension springs 30 connected to the control levers 7A, 6B and 9A, 9B in the upward direction about the axle 10 until the counterpressure rollers 13, 15 come to rest against the upper drive rollers 32, 33. The control levers 7A, 7B and 9A, 9B reach their end positions via the control curves 1A, 1B and 2A, 2B which has the result that the tension springs 36 are further pretensioned by a small amount. The safe contact between the control rollers 29 and the control curves 1A, 1B and 2A, 2B is achieved by the tension springs 29 connected to the spring suspension rod 18. The precise lower position of the counterpressure levers 6A, 6B and 8A, 8B is reached at the stop bolts 11, 12 on the control levers which are supported on the counterpressure levers after a short return stroke and entrain them in the downward direction. The corresponding positions are illustrated in detail in the Figures.

The support roller 14 positioned at the center, which moves the letter to an exact spacing relative to the inkjet print heads, is seated rotationally supported on two support roller carriers 21 which are, in turn, supported by means of two parallelogram linkages 16A, 16B. The cam follower 22 seated on the rotation axle of the support roller 14 is connected to the axle 34 of the right counterpressure rollers 13 and is forced to move in the downward direction when lowering the right counterpressure lever 6A, 6B and reaches the level of the right counterpressure roller. The cam follower 22 is supported via the stop 35 against the Air support roller carrier 21 rigidly in regard to rotation to the left. With regard to rotation to the right, the cam follower 22 can rotate away from the stop 35 counter to the force of the tension spring 36. This is required because of the mutual sensing between the right and the left counterpressure rollers and will be described in more detail later on.

Description of FIGS. 1 to 4:

The counterpressure levers are in the initial position ready for insertion of an individual letter. As soon as the letter is positioned in an exact position to the rear and the right defined by the table stop, the franking machine is activated by means of a reflective light barrier. First the main shaft 3 rotates about approximately one-third revolution in the clockwise direction. The control levers 7, 9 are pivoted upwardly by the control rollers 29 by means of the control curves 1, 2. The counterpressure levers are also moved upwardly via the tension springs 30 until the counterpressure rollers 13, 15 rest against the drive rollers 32, 33. The control levers move still farther until the control curve has reached its highest point. The possible overstroke of the control lever is compensated by the sprung coupling of the counterpressure levers. The support roller 14 has been adjusted by means of the cam follower 22 to the same level. The letter is now clamped between the drive rollers and the counterpressure rollers. The drive motor 40 (see FIG. 8) drives via the gear mechanism 41 the drive rollers 31, 33 and moves the letter from the right to the left. The speed and position detection is realized by the incremental transponder 42 and the sensing wheel 38. The sensing wheel is driven by friction by means of the moving envelope and detects thus the precise speed of the letter surface. As a function of the letter position, the inkjet print heads spray corresponding line patterns which result in the desired print image. The holding-down plate or the guide part 39 secures the letter at an exact spacing to the print head end face in order to enable with respect to resolution a clean print image and, furthermore, to prevent that the printed lines smear when moving the envelope. After completion of the franking process the drive motor is switched off and the main shaft returns by rotation into its initial position; the counterpressure levers reach again their initial position. A new letter can be inserted. The main shaft 3 rotates between the position "insertion" and "franking" only by approximately one-third revolution back and forth, which provides a considerable time advantage and moreover is gentle on the mechanism. After a further one-third revolution the counterpressure rollers have reached their absolute lowest position as is required in the service position (see FIG. 4). Movement back into the initial position "insertion" requires also one-third revolution.

PARTS IDENTIFICATION LIST

201 service slide
202 lifting tub
203 sealing bell
204 sealing bell receptacle
205 pressure spring for sealing bell
206 angle connector
207 suction hose of the sealing bells
208 wiper module
209 wiper lip
210 suction hose of wiper module
211 catch basin
212 guide bore for column
213 pressure spring for wiper tub
214A sensing curve—left
214B sensing curve—right
215 curved Scotch-yoke groove
216 lifting support
217 pressure spring for lifting tub
218 control disc
219 freewheeling sleeve
220 drive shaft for control disc
221 eccentric pin
222 control angle piece
223 control pin
224 microswitch for zero point positioning
225 guide and pulling column

Figure 5:
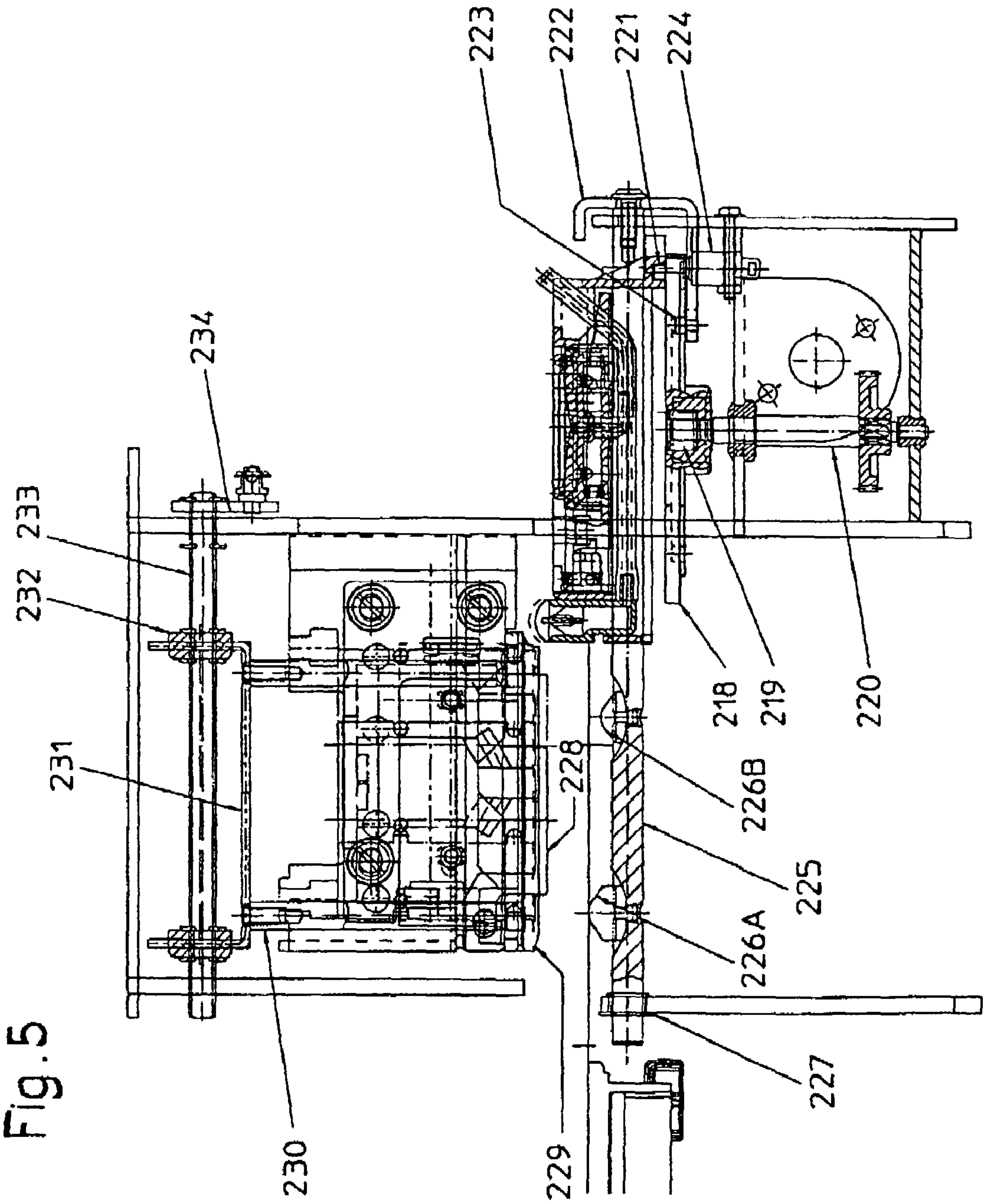
Figure 6:
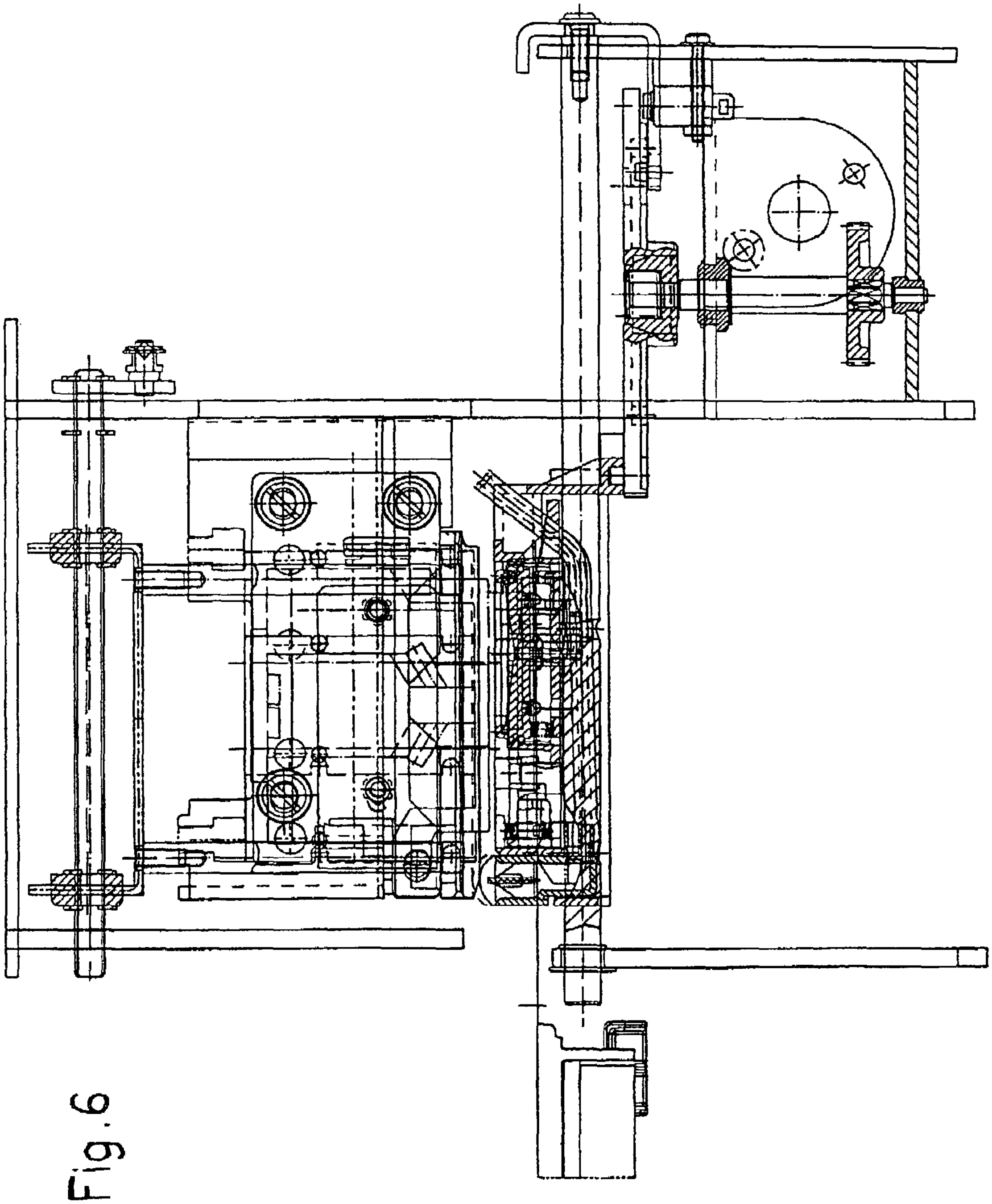
Figure 7:
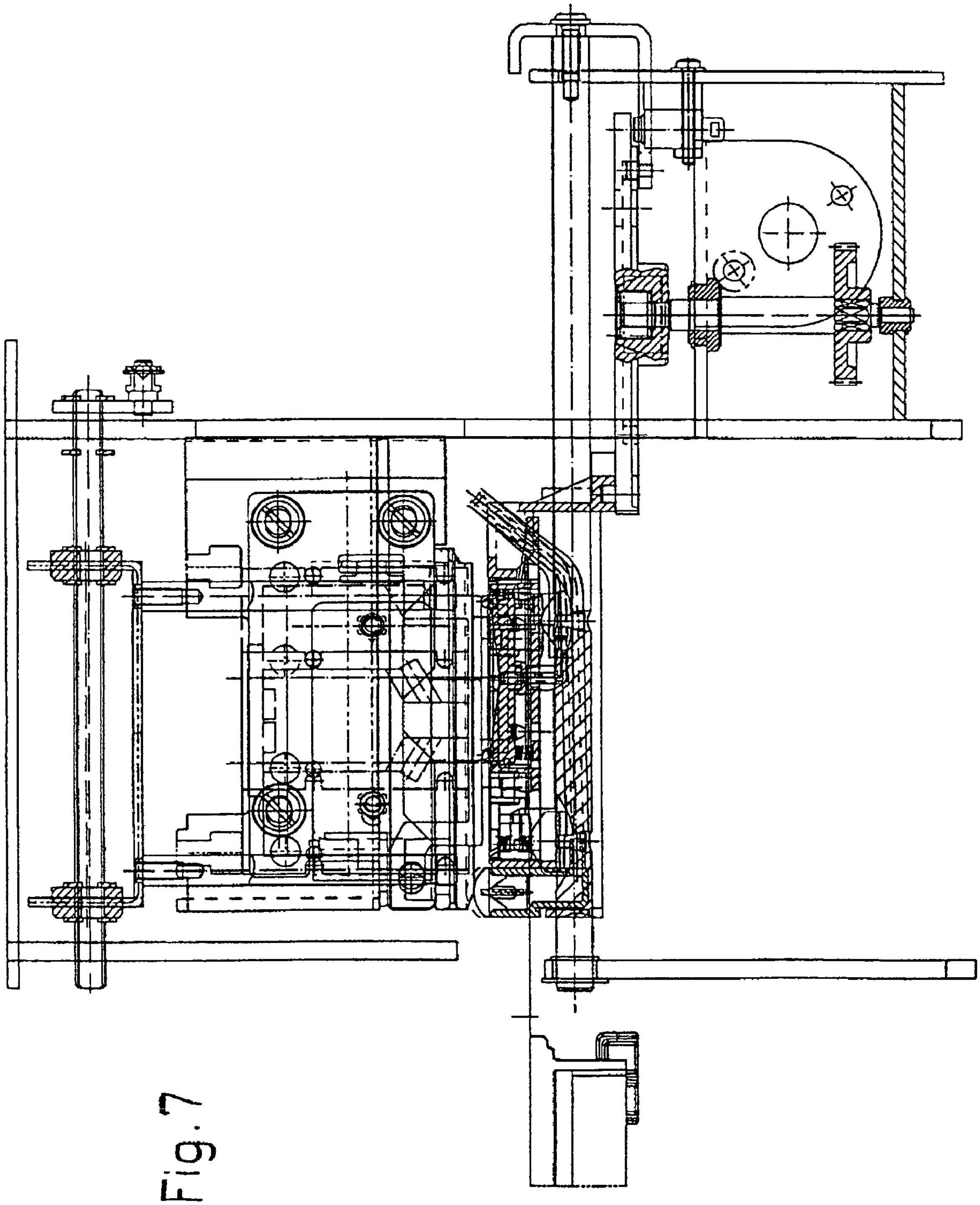
Figure 10:
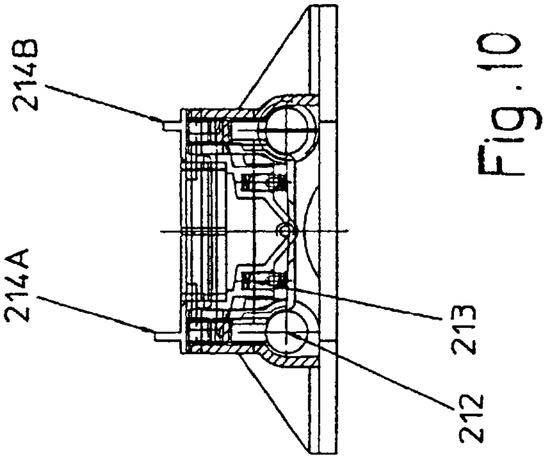
Figure 8:
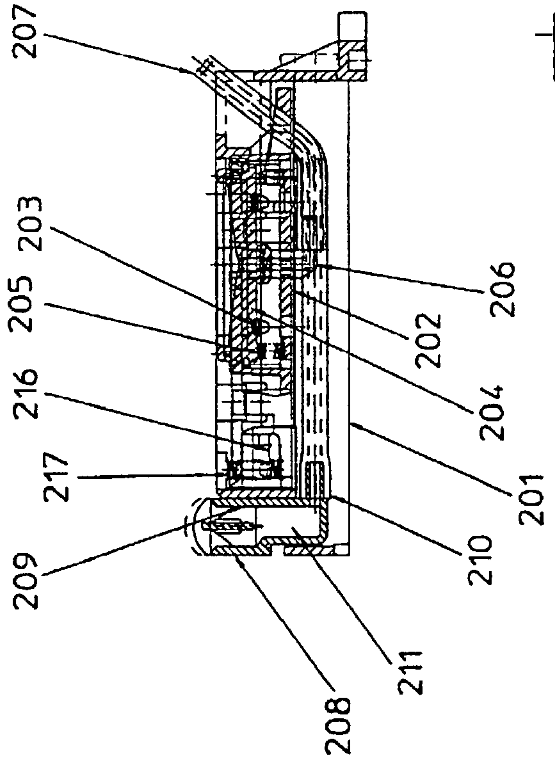
Figure 9:
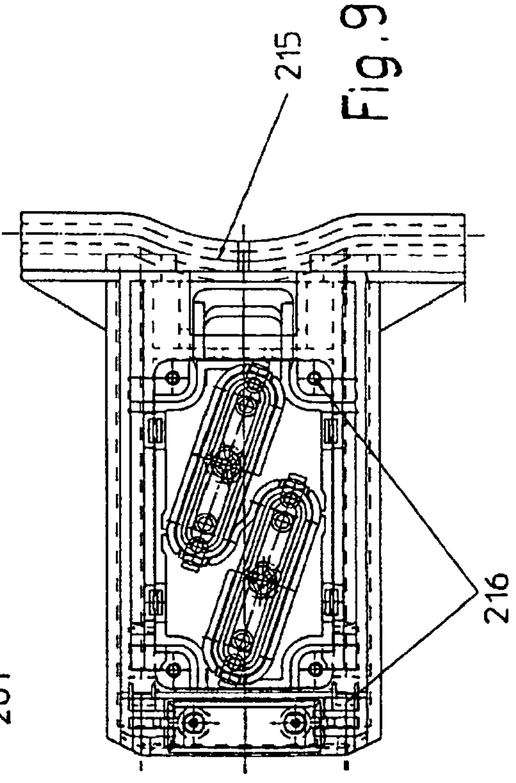
Figure 12:
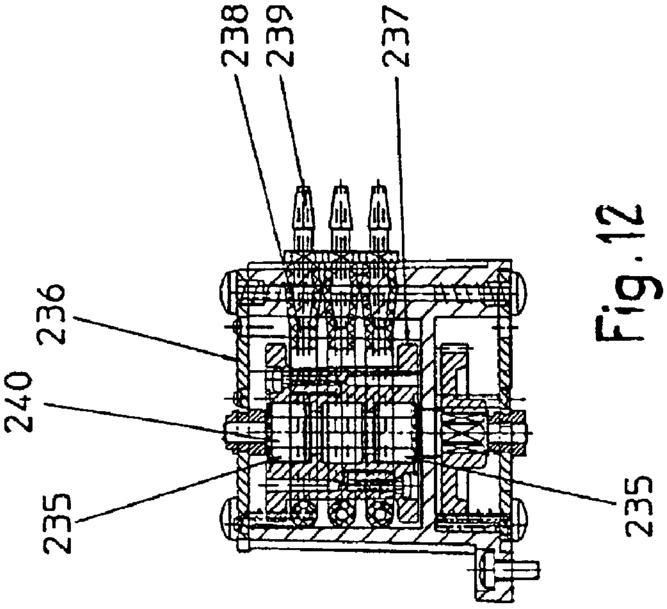
Figure 11:
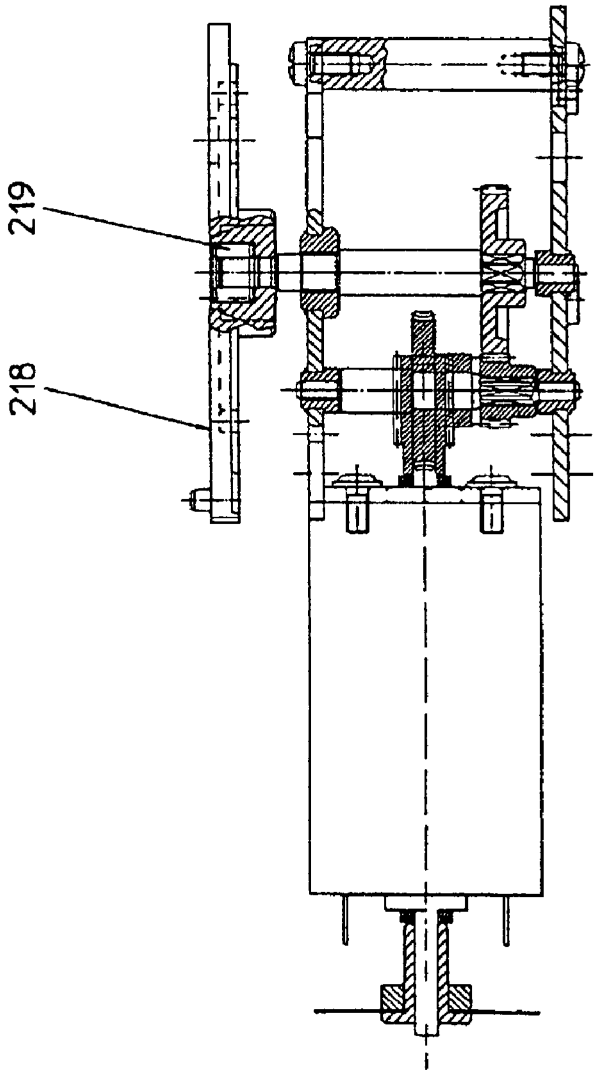
Figure 13:
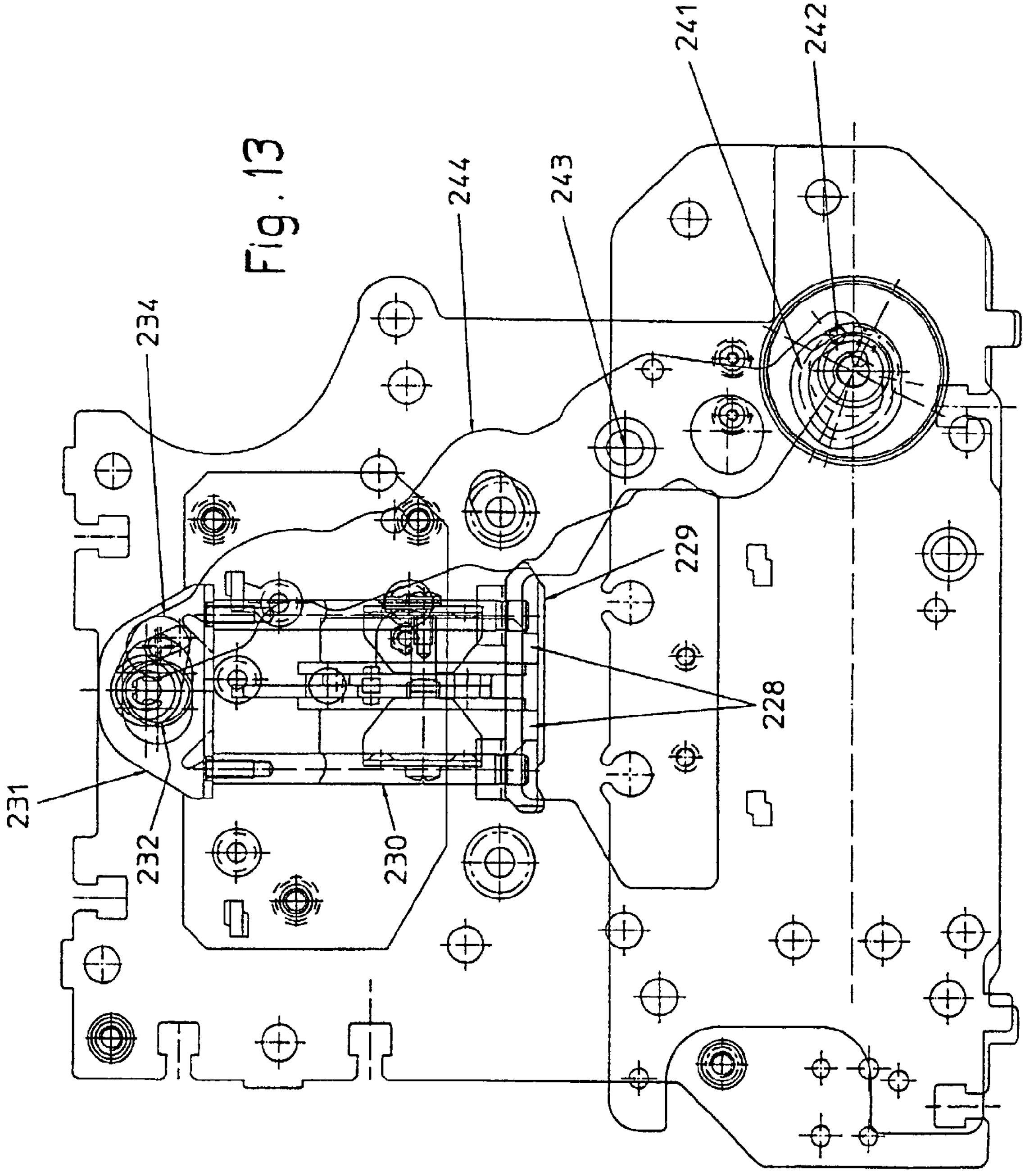
Figure 14:
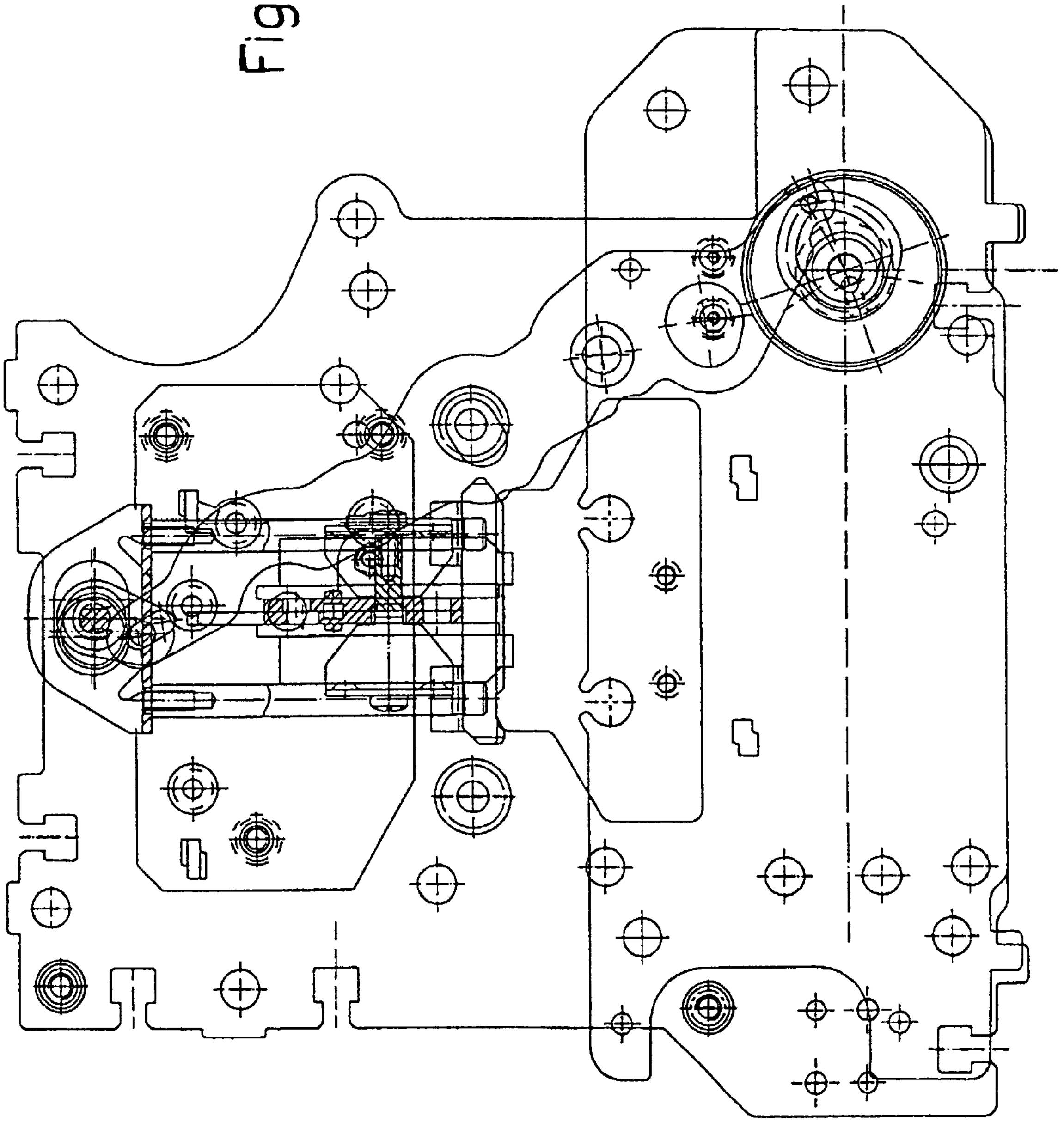

226A lift control curve—front
226B lift control curve—rear
227 glide bushing
228 print head
229 holding-down plate
230 lifting column
231 head plate for lifting columns
232 eccentric
233 axis of rotation
234 pivot lever
235 freewheeling sleeve (hose pump)
236 pump housing
237 roller body
238 pump hose
239 hose connector
240 pump shaft
241 control curve for holding-down plate or guide part in the worm wheel of the main shaft drive
242 sensing pin
243 pivot point for control lever
244 control lever Description of Contents of Drawings for the Following Figures:

FIG. 5 service slide in the rearward position, holding-down plate in the upper position;

FIG. 6 longitudinal section of print head plane and service slide service slide is of the front position, holding-down plate or guide part in the upper position, wiper module at the holding-down plate or guide part maintained at height level, lifting tub of service slide still in the lower position;

FIG. 7 longitudinal section of print head plane and service slide service slide is in the front position, holding-down plate or guide part in the upper position, wiper module at the holding-down plate or guide part maintained at height level, lifting tub of the service slide is lifted, pulling columns are pulled to the rear, sealing bells are resting against the end faces of the print heads;

FIGS. 8–10 detail illustration service slide with lifting tub, sealing bells, and wiper module;

FIGS. 11+12 detail illustration service and hose pump drives with drive motor;

FIG. 13 front view of control mechanism of holding-down plate or guide part by means of a control curve seated on the main shaft, holding-down plate or guide part in lower position (franking mode); and FIG. 14 front view of the control mechanism of the holding-down plate or guide part by means of the control curve seated on the main shaft, holding-down plate or guide part in upper position (service mode).

The service station is provided for print head cleaning of an inkjet printing mechanism during operation and sealing of the inkjet print heads for extended periods of non-use or for taking in the ink from a newly inserted ink bag. The cleaning is carried out by means of a wiper wiping along the lower print head side. The sealing bells are positioned by means of the service slides under the end face of the print heads or jet plane and are then moved approximately vertically upwardly in order to seal the jets. A hose pump with three separate suction hoses pumps the residual ink of the wiping process out of the wiper module or the ink which has been sucked away or after-sucked via the print heads during filling of the system into a catch basin. The movement of the service slide is realized by a Scotch-yoke drive which is motor-driven by a worm gear. The same drive drives also the hose pump. Since the two functions are never needed simultaneously, they can be realized by a single drive motor by using freewheeling sleeves and different motor rotation directions. The holding-down plate or the guide part ensuring the spacing of the letter object to the end faces of the print heads is positioned in the franking mode approximately 1 mm below the print heads and must be moved in the service or cleaning mode upwardly, approximately 1.5 mm, behind the print head end face. This is realized in connection with lowering of the counterpressure lever, controlled by the main shaft.

The inkjet print heads 228 are attached to an adjusting module. By means of this mechanical device the print heads can be precisely adjusted relative to one another so that the initial pixel of one head coincides precisely with the final pixel of the second head and in this way no print image gaps result. The print heads are connected by means of hoses to an ink container which can be easily exchanged. For the first operation, the ink must be removed by vacuum from the ink bag and the print heads must be flooded. For this purpose, the service slide 201 is driven by means of the control disc 216 into the forward position. The eccentric pin 221 of the control disc 218 engages the groove 215 of a Scotch-yoke of the service slide 201. As a result of the shape of the Scotch yoke groove, the service slide is moved forwardly only until the eccentric pin 221 reaches the curved area of the groove. The radius of the groove is of the same size as the eccentric stroke of the eccentric pin which means that the slide is now no longer moved and has reached its end position. The curvature of this groove is reached after an angle of rotation of approximately 150°. The sealing bells are now positioned precisely underneath the print heads. Upon forward movement of the service slide, the wiper lip 209 of the wiper module 208 has wiped the end faces of the print heads 228 and has cleaned them. The wiper module has been adjusted by means of the sensing curve 214A, 214B against the pressure springs 213 at the lower surface of the holding-down plate or the guide part 229 to the required height so that the defined coverage of the wiper blade relative to the printed end face results. While the control disc 218 rotates by a further 30°, the control angle piece 222 is moved with the guide and pulling columns 225 corresponding to the geometry of the lower control curve of the control disc 218 in the downward direction. The lift control curves 226A, 226B inserted into the columns 225 are moved also and lift thereby the lifting tub with the sealing bells against the force of the pressure springs 217 via the lifting supports 216 by a further defined lifting stroke. The two sealing bells 203 seated in the lifting tub and the sealing bell receptacle 204 also move upwardly until the sealing bell profile rests against the end faces of the print heads. The overstroke of the lifting tub 202 is compensated by the pressure springs 205. The print heads are now sealed. The motor of the service drive changes its direction of rotation and activates the operation of the hose pump. The control disc 218 no longer rotates as a result of the provided freewheeling sleeve. The freewheeling sleeves 235 now act in the entraining direction. In the case of a service slide movement they act as a freewheeling device. While the hose pump 236 rotates, the wiped-off ink is removed from the wiper module 208 or the catch basin 211 by suction and at the same time ink is removed by suction via the print heads 228 out of the ink bag and the print heads are flooded. During the service process the holding-down plate or guide part 229 must be in the upper position and its lower surface area must be retracted relative to the print head end faces. Lifting of the holding-down plate or guide part is realized by the control curve 242 and the joint function of the parts control lever 244, pivot lever 234, axis of rotation 233, and eccentric 232. The eccentric 232 lifts the head plate 231. By means of the lifting columns 230 the holding-down plate or the guide part is moved upwardly. After filling of the print heads the control disc is rotated by 30° and the lifting tub is lowered into the initial position. The sealing bells are again released. By means of the hose pump the ink rest is removed by suction from the sealing bells. Subsequently, the service slide can be returned into its initial position. Upon returning, the print heads are again wiped. The zero point position is found by a switching cam on the control disc 218 and the microswitch 224. By means of the slotted disc seated on the motor axle and a forked light barrier, any desired slide position can be precisely reached and any number of pump revolutions are possible.

What is claimed is:

1. Franking machine with at least one print head of an inkjet print mechanism for printing flat postal objects such as letters or postcards insertable into or passing through the machine, comprised of a guide part arranged so as to project about the print head and further relative to a jet opening plane of the print head, having correlated therewith a transport device for transporting the postal objects between the print head and oppositely positioned conveying rollers rotating about axes oriented transverse to the conveying direction, wherein the transport device has two drive rollers connected in driving connection with one another and forming together with the guide part a conveying path, which drive rollers, when viewed in the conveying direction, are arranged before and behind the print head, and has a counterpressure roller arranged opposite thereto, respectively, which exerts a pressure against one drive roller or the postal object transported therebetween and which is reversibly liftable, and comprising a device for maintaining, cleaning and servicing the print head, wherein, when the counterpressure rollers (13, 15) are lowered, a service slide (201), arranged on a guide arrangement (225) so as to be drivingly movable transverse to the conveying direction of the postal objects, is moveable into a service position which is arranged underneath the print head (228), wherein the service slide (201) at the forward end has a wiperlip (209) extending transversely to the direction of movement and acting during movement of the service slide (201) onto the projecting let opening plane of the print head (228), wherein the service slide (201) in the advancing direction has at least one sealing bell (203) which is arranged behind the wiper lip (209) and covers the nozzle opening plane of a print head (228) and can be pressed against the plane by being lifted, and wherein the service slide (201) comprises a Scotch-yoke groove (215) as a connecting device to the control disk (218) for receiving the eccentric pin (221), wherein the groove secures the service slide (201) in the service position when the eccentric pin (221) passes through and, upon further rotational movement of the control disk (218) connected in driving connection with the guide arrangement (225), the service slide (201) is locked in the service position by means of the lifting control curves (226A, 226B) provided on the guide arrangement (225), whereby the sealing bell (203) is pressed against the let opening plane.

2. Machine according to claim 1, wherein the guide part (229) is adjustable by means of a control lever (244) connected with the main shaft into a position which is retracted relative to the jet opening plane of the print head (228).

3. Machine according to claim 1, wherein the service slide (201) has a rear end connected with an eccentric pin (221) fastened to a control disk (218) drivable about a vertical axis.

4. Machine according to claim 3, wherein the control disk (218) comprises a switching cam cooperating with a switch (224) and correlated with the initial position of the service slide (201).

5. Machine according to claim 1, wherein the wiper lip (209) is supported against a spring force on the guide part (229) and passes across the jet opening plane during the sliding movements of the service slide (201).

6. Machine according to claim 1, wherein the wiper lip (209) is arranged in a catch basin (211).

7. Machine according to claim 1, wherein on the guide arrangement (225) a control pin (223) is fastened which engages the control curve provided on the control disk (218).

8. Machine according to claim 1, wherein the controllable motor which is in drive connection with the control disk (218) having a freewheeling device is reversibly configured and in drive connection with a pump which is in communication with the sealing bell (203).

9. Machine according to claim 8, wherein the pump is connected by a suction line with the catch basin (211) correlated with the wiper lip (209).

10. Machine according to claim 1, wherein the pump is connected to the ink source by a suction line via the sealing bell (203) connected in the service position to the print head/the print heads (228).

11. Machine according to claim 10, wherein the print head/the print heads (228) and the ink source are connected by a portion of the suction line.

* * * * *